(12) United States Patent
Jaeger et al.

(10) Patent No.: US 7,140,682 B2
(45) Date of Patent: Nov. 28, 2006

(54) ADJUSTING DEVICE FOR A VEHICLE SEAT

(75) Inventors: David Jaeger, Köln (DE); Nick Xiromeritis, Southfield, MI (US); Tamas Karacsonyi, Wuppertal (DE); Marc Clark, Burscheid (DE)

(73) Assignee: Johnson Controls Technology Company, Holland, MI (US)

( * ) Notice: Subject to any disclaimer, the term of this patent is extended or adjusted under 35 U.S.C. 154(b) by 31 days.

(21) Appl. No.: 10/363,303

(22) PCT Filed: Aug. 24, 2001
(Under 37 CFR 1.47)

(86) PCT No.: PCT/EP01/09777

§ 371 (c)(1),
(2), (4) Date: Oct. 23, 2003

(87) PCT Pub. No.: WO02/18170

PCT Pub. Date: Mar. 7, 2002

(65) Prior Publication Data
US 2004/0075322 A1    Apr. 22, 2004

(30) Foreign Application Priority Data
Sep. 1, 2000    (DE) .......................... 200 15 115 U

(51) Int. Cl.
*B60N 2/02*    (2006.01)

(52) U.S. Cl. .................. 297/330; 297/329; 297/344.2; 297/344.15

(58) Field of Classification Search ................ 297/330, 297/325, 344.15, 316, 328, 340, 344.17, 297/344.16, 322, 329, 344.2; 248/394, 395, 248/396, 397, 421, 393
See application file for complete search history.

(56) References Cited

U.S. PATENT DOCUMENTS 1,426,129 A    8/1922    Velo (Continued)

FOREIGN PATENT DOCUMENTS

DE    32 22 386 A1    2/1984

(Continued)

OTHER PUBLICATIONS

International Search Report for WO 02/18170 (PCT/EP01/09777) completed on Dec. 11, 2001, mailed on Dec. 19, 2001 (4 pgs.).

*Primary Examiner*—Milton Nelson, Jr.
(74) *Attorney, Agent, or Firm*—Foley & Lardner LLP

(57) ABSTRACT

A vehicle seating system for adjusting, without rails, the vertical and longitudinal position and the inclination of a vehicle seat relative to a vehicle floor has, in one embodiment, first and second pivot levers, spaced apart from one another in an adjustment direction. The pivot levers are articulated respectively on the vehicle seat and on the vehicle floor by way of pivot pins extending parallel to one another. The pivot pins arranged on the vehicle seat and on the vehicle floor of at least one of the pivot levers are lockable independently of one another.

9 Claims, 1 Drawing Sheet

U.S. PATENT DOCUMENTS

| | | | |
|---|---|---|---|
| 1,769,343 A | 7/1930 | Henry | |
| 2,140,968 A | 12/1938 | Paranzino | 296/24 |
| 2,465,770 A | 3/1949 | Volsk | 296/37 |
| 2,525,952 A | 10/1950 | Saterlie et al. | 312/172 |
| 2,942,647 A | 6/1960 | Pickles | 155/14 |
| 3,022,035 A | 2/1962 | Pickles | 248/395 |
| 3,037,735 A | 6/1962 | Matthews | 248/394 |
| RE25,293 E | 12/1962 | Pickles | 248/394 |
| 3,336,071 A | 8/1967 | Neale et al. | 296/64 |
| 3,711,153 A | 1/1973 | Cunningham | 297/346 |
| 4,128,225 A | 12/1978 | Kluting et al. | 248/421 |
| 4,198,091 A | 4/1980 | Appleton | 296/63 |
| 4,270,790 A | 6/1981 | Curotto | 296/37.16 |
| 4,286,819 A | 9/1981 | Inoue et al. | 296/65 |
| 4,733,901 A | 3/1988 | Okuyama | 296/37.16 |
| 4,767,157 A * | 8/1988 | Kazaoka et al. | 297/322 |
| 4,932,709 A | 6/1990 | Wainwright | 296/65.1 |
| 5,195,795 A | 3/1993 | Cannera et al. | 296/65.1 |
| 5,273,336 A | 12/1993 | Schubring et al. | 296/65.1 |
| 5,358,308 A * | 10/1994 | Judic et al. | 297/316 |
| 5,527,087 A | 6/1996 | Takeda et al. | 297/15 |
| 5,628,543 A | 5/1997 | Filipovich et al. | 297/113 |
| 5,795,023 A | 8/1998 | Kayumi | 297/331 |
| 5,882,061 A * | 3/1999 | Guillouet | 296/65.05 |
| 5,890,758 A | 4/1999 | Pone et al. | 297/15 |
| 5,967,584 A | 10/1999 | McCarthy et al. | 296/37.16 |
| 5,975,612 A | 11/1999 | Macey et al. | 296/66 |
| 5,979,964 A | 11/1999 | Ban et al. | 296/66 |
| 5,979,985 A * | 11/1999 | Bauer et al. | 297/340 |
| 6,019,413 A | 2/2000 | Scraver et al. | 296/66 |
| 6,234,553 B1 | 5/2001 | Eschelbach et al. | 296/65.14 |
| 6,290,198 B1 * | 9/2001 | Kojima et al. | 248/422 |
| 6,378,941 B1 | 4/2002 | Opfer et al. | 297/257 |
| 6,488,337 B1 * | 12/2002 | De Voss et al. | 297/344.13 |

FOREIGN PATENT DOCUMENTS

| | | |
|---|---|---|
| DE | 40 10 451 C2 | 10/1991 |
| DE | 43 26 122 | 2/1995 |
| DE | 197 42 773 A1 | 4/1999 |
| EP | 0 445 528 A2 | 9/1991 |
| EP | 235793 | 7/1992 |
| WO | WO 90/00989 * | 2/1990 |
| WO | WO 02/20303 | 3/2002 |

* cited by examiner

ADJUSTING DEVICE FOR A VEHICLE SEAT

The invention concerns an apparatus for adjusting the vertical and longitudinal position and the inclination of a vehicle seat relative to a vehicle floor, the vehicle seat having two pivot levers, spaced apart from one another in an adjustment direction, that are articulated respectively on the vehicle seat and on the vehicle floor by way of pivot pins extending parallel to one another.

The invention furthermore concerns a vehicle seat having an apparatus of this kind.

In order to make possible an optimum seating position for each of the various users of a vehicle seat, in particular the drivers of a motor vehicle, adjustment of the vertical and longitudinal position and the inclination of the vehicle seat relative to the vehicle floor is indispensable.

In a vehicle coordinate system, there is defined specifically for each vehicle a curve on which the so-called hip point, related to the human body and the seat, can move in order to guarantee optimum conditions in terms of grasping the steering wheel, reaching switches, operating the pedals, seeing out the windows, and much more. The hip point is defined by the hip joint, constituted by the pivot point of the upper thigh bone in the pelvic bone. The hip point thus constitutes the point which determines the position of the vehicle occupant in the vehicle coordinate system when he or she is seated on the vehicle seat. The hip point and the vehicle seat must be considered in combination, and are critical in terms of developing a seat adjustment apparatus. For example, a heavy person sinks more deeply into a soft seat cushion than does a light person, and different degrees of cushion hardness mean that the same user sinks to different depths.

The hip point of the vehicle driver should always move on the curve (hip point path) arranged relative to the vehicle coordinate system. This curve represents the path of the hip point of standard persons (called "percentiles") commonly used in automotive engineering, when those persons are positioned optimally in the vehicle. It should be noted here that the hip point of, for example, a short woman (5th-percentile woman) must be positioned toward the front and upward in the woman's viewing direction (usually also the direction of travel), and the hip point of a tall man (95th-percentile man), conversely, toward the back and downward. A plurality of different hip point paths generate a so-called hip point field (H-point field) that is arranged around the hip point path of the standard persons.

In addition to people's different heights, it is found that each person has a different shape; in terms of the aforesaid standard persons, there is a rough division into so-called "seat giants" and "seat dwarfs." "Seat giants" have a long upper body with short legs; "seat dwarfs," on the other hand, have a short upper body with long legs. For most people, therefore, there is necessarily a deviation from the hip point path of the standard persons.

Because it is necessary always to position the hip point in the H-point field, seat adjustment apparatuses such as those disclosed, for example, in the publications DE 32 22 386 A1, DE 40 10 451 C2, and EP 0 445 528 A2 are required.

DE 32 22 386 A1 describes an adjustment apparatus in which the vertical adjustment is implemented by means of an inclined plane. The seat can be correspondingly positioned using the inclined plane in combination with the longitudinal adjustment device carried thereby.

In DE 40 10 451 C2 and EP 0 445 528 A2, on the other hand, adjustment apparatuses constituted by a parallelogram linkage and a displacement apparatus for longitudinal adjustment, arranged between the lower seat frame and the vehicle floor, are provided for adjustment of the seat position.

In the adjustment apparatuses discussed above, adjustment of the longitudinal position of the vehicle seat relative to the vehicle floor is brought about using a guide rail pair having all the known disadvantages such as large space requirement, jamming susceptibility, etc.

DE 197 42 773 A1 discloses a variable seat for transport systems, usable preferably in aircraft and railways, that dispenses with a longitudinal rail pair. For installation in motor vehicles, however, the seat has considerable disadvantages which rule out advantageous utilization. For example, a central locking apparatus must be unlocked in order to bring the seat into the desired position, thus making all the joints freely movable and therefore initially rendering the seat uncontrollably pivotable about its articulation axes, like a deck chair. This means that in the event of incorrect operation or a collision at the front or rear of the vehicle, an occupant in an unlocked seat is not retained.

It is the object of the invention to create a device, or a vehicle seat having such a device, for adjusting the vertical and longitudinal position and the inclination of a vehicle seat relative to the vehicle floor that permits an adjustment of the vehicle seat without the use of longitudinal guide rails. In particular, positioning of the hip point along a travel of at least 200 mm (hip point path) and, in the case of persons deviating from standard dimensions, a correction of the position of the hip point within a vehicle-specific H-point field, are to be possible. The adjustment apparatus is intended to be usable with vehicle seats that can be installed in and removed from the vehicle without tools, by means of special known anchoring devices. According to the present invention, this is achieved by the fact that the pivot pins, arranged on the vehicle seat and on the vehicle floor, of a pivot lever are lockable independently of one another, the pivot lever having the lockable pivot pins comprising an additional pivot pin extending parallel to the pivot pins.

Advantageously, four pivot levers are arranged on a vehicle seat—one pivot lever at each of the four corners of the vehicle seat (so-called four-joint linkage). The pivot levers at the rear in the viewing direction (which generally also corresponds to the direction of travel) of the user sitting on the vehicle seat each have an additional pivot pin extending parallel to the pivot pins, so that the levers each subdivided into two articulatedly connected sub-levers. Because a pivot pin can be selectably locked, the vehicle seat is pivotable in each case, on the basis of a four-joint linkage, by way of the unlocked pivot pins. This device according to the present invention based on two superimposed four-joint linkages, or a "five-jointer," permits adjustability of the vehicle seat in a plurality of different positions. The lockable pivot pins are advantageously driven, the drive apparatuses simultaneously ensuring locking. The advantageous construction of the adjustment mechanism furthermore allows the entire adjustment system to be installed in a kind of box under the vehicle floor, so that only the pivot lever pairs are partially visible in the front and rear seat regions.

Further advantageous embodiment features of the invention are contained in the dependent claims and the description below.

The invention will be explained in more detail with reference to a preferred exemplary embodiment illustrated in the drawings, in which.

In the various Figures of the drawings, identical parts are consistently labeled with the same reference characters.

Figure 1:
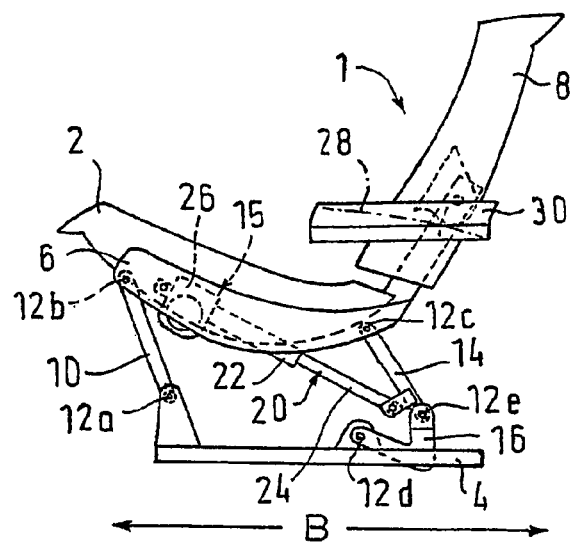
FIG. 1 is a schematic depiction, from the side, of an apparatus according to the present invention with the vehicle seat positioned, for example, toward the front in the direction of travel.
Figure 2:
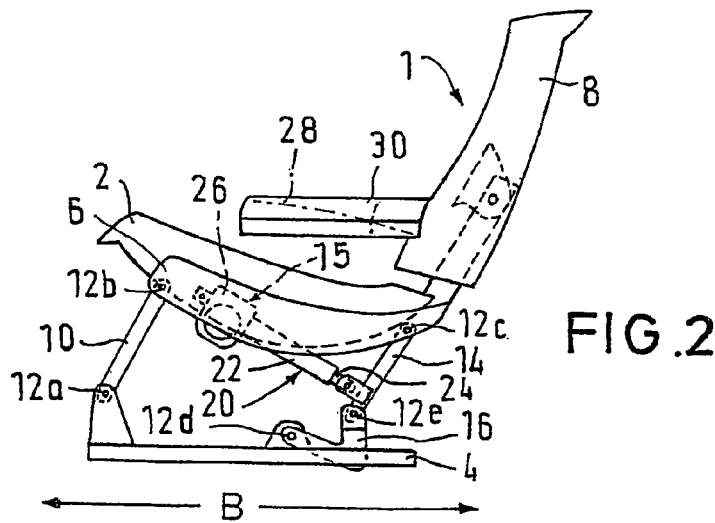
FIG. 2 is a schematic depiction, from the side, of the apparatus according to the present invention depicted in FIG. 1, with the vehicle seat positioned toward the rear in the direction of travel.
Figure 3:
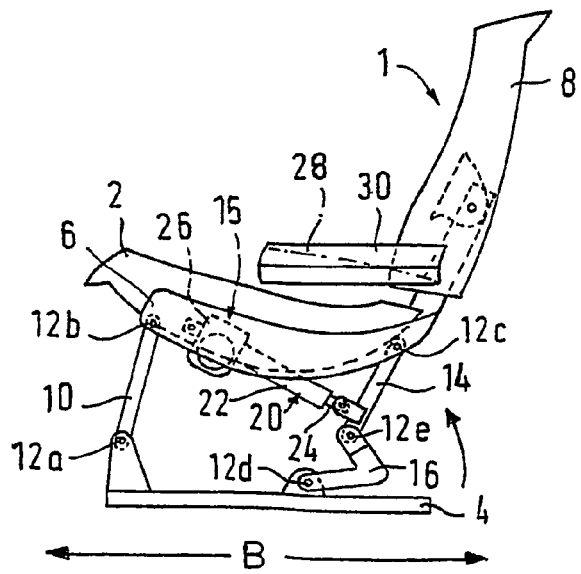
FIG. 3 is a schematic depiction, from the side, of the apparatus according to the present invention depicted in FIG. 1, with the vehicle seat positioned toward the rear in the direction of travel and elevated.

FIGS. 1 through 3 illustrate the manner of operation of an apparatus according to the present invention. A vehicle seat 1 comprises a seat cushion 2, a stable seat shell 6 facing toward a vehicle floor 4, and preferably a seatback 8. Vehicle seat 1 has a first pivot lever 10 connected to the vehicle floor, and, spaced away from that lever in an adjustment direction B, a second pivot lever 14 connected to the vehicle floor. Pivot levers 10, 14 are articulated on vehicle seat 1 and on vehicle floor 4 by way of respective pivot pins 12a, 12b, 12c, 12d extending in parallel, having pivot axes extending parallel to one another. Advantageously, each two pivot levers 10, 14 can also be arranged opposite one another in corner regions of seat cushion 6.

According to the present invention, one of pivot levers 10, 14, for example second pivot lever 14, has an additional pivot pin 12e extending parallel to pivot pins 12a, 12b, 12c, 12d, so that it is subdivided into two lever segments (14, 16). The result is an intermediate lever 16 that is connected on the one hand via pivot pin 12e to pivot lever 14, and on the other hand via pivot pin 12d to vehicle floor 4. Intermediate lever 16 is preferably embodied as a V-shaped angled lever, the open angle of the angled lever facing approximately toward first pivot lever 10. Pivot pin 12c arranged on vehicle seat 4, and pivot pin 12d of second pivot lever 14 or intermediate lever 16 arranged on the vehicle floor, are, according to the present invention, each lockable independently of one another. As a result of the selectable locking of one of these pivot pins 12c, 12d, vehicle seat 1 is pivotable, on the basis of a four-joint linkage in each case, by way of the unlocked pivot pins 12a, 12b, 12c, 12e or 12a, 12b, 12d, 12e. In each case, pivoting of the two four-joint linkages causes both a vertical and a longitudinal adjustment, the adjustment curves of the two adjustable four-joint linkages being superimposed so that a plurality of different positions can be established for vehicle seat 1.

Pivot pin 12d advantageously has a drive apparatus (not depicted) for the pivoting motion. Driving and locking can be combined, for example by way of a self-locking electric motor, a manually operated stepped shifting mechanism, or another suitable drive means.

In order to lock pivot pin 12c, and in order to adjust vehicle seat 1 or seat shell 6 into the desired positions, a further lockable drive mechanism 15 is at one end attached to seat shell 6 approximately in the vicinity of pivot pin 12b of first pivot lever 10, and at the other end is articulated on second pivot lever 14 between pivot pins 12c and 12e. A spindle-nut drive 20 actuated by an electric motor, comprising a nut, a spindle 24, and a drive 26, has proven useful as a drive mechanism. A telescope-like configuration of the spindle-nut drive 20, in which spindle 24 can be partially screwed into and out of a nut housing 22, is particularly advantageous for space reasons. When pivot levers 10, 14 are arranged in pairs, spindle-nut drive 20 can be arranged in the center of seat shell 6 and joined via transverse shafts (not depicted) to second pivot lever pair 14. The use of two or more drive apparatuses is also conceivable, in which case provision must be made for synchronous operation.

FIG. 1 depicts the position of vehicle seat 1 with spindle 24 of spindle-nut drive 20 completely extended. According to the present invention, in this position the V-shaped intermediate lever 16 is positioned in such a way that pivot pin 12e is at a short distance from vehicle floor 4, so that pivot bearings 12d and 12e are at almost their maximum distance from one another in the direction of adjustment direction B. When spindle 24 of spindle-nut drive 20 is screwed from this position into nut housing 22 while pivot pin 12d is locked, the vehicle seat is moved by way of pivot joints 12a, 12b, 12c, and 12e along adjustment direction B into a rear position as shown in FIG. 2. On the other hand, extending spindle 24 (for example from the position depicted in FIG. 2) while pivot joint 12d is locked correspondingly causes vehicle seat 1 to move in the opposite direction. As a result of the curved trajectories associated with pivot levers 10, 14, vehicle seat 1 is simultaneously adjusted vertically to a small extent during the longitudinal motion, depending on the position of pivot levers 10, 14.

FIG. 3 illustrates the adjustment of vehicle seat 1 on the basis of a pivoting motion of the driven pivot pin 12d with pivot pin 12c locked. Because of the small distance between pivot pin 12e and vehicle floor 4 in the starting position shown in FIG. 2, pivoting of pivot pin 12d causes for the most part a vertical adjustment of vehicle seat 1, since the distance between pivot pin 12e and vehicle floor 4 becomes much greater, while the longitudinal motion of vehicle seat 1 associated with this pivoting motion is small.

The position of vehicle seat 1 depicted in FIG. 3 is necessary, for example, for a short woman (5th-percentile woman), while the position depicted in FIG. 1 is the seating position for a tall man (95th-percentile man). Intermediate positions for so-called "seat dwarfs" or "seat giants" can easily be established using intermediate lever pair 16.

Hip point path 28 that is also plotted in FIGS. 1 through 3, and hip point field 30 resulting from the adjustment capabilities of vehicle seat 1, further illustrate the large number of possible seat positions that can be established by superimposition of the four-joint linkages.

The apparatus according to the present invention for adjusting a seat position is suitable for coupling with an adjustment apparatus for seatback 8. For example, an electric-motor drive can be provided for setting the inclination of seatback 8, and could be coupled to the adjustment mechanism of seat shell 6 by way of an additional suitable lever mechanism. Completely independent, manually actuated setting of the seatback inclination is, however, also possible.

The apparatus according to the present invention makes possible easy and convenient adjustment of the vertical and horizontal position and the inclination of vehicle seat 1 relative to vehicle floor 6. The use of longitudinal guide rails can be dispensed with. The apparatus according to the present invention is usable with vehicle seats that can be installed in and removed from the vehicle without tools, by means of special known anchoring devices.

The invention is not limited to the exemplary embodiment depicted and described, but rather encompasses all embodiments of identical function as defined by the invention. The invention is moreover so far not yet limited to the combination of features defined in Claim 1, but rather can also be defined by any other desired combination of specific features of all of the totality of the disclosed individual features. This means that in essence practically any individual feature of Claim 1 can be omitted or replaced by at least one individual feature disclosed elsewhere in the Application. Claim 1 is thus to be understood only as a first attempt at stating the invention.

The invention claimed is:

1. A vehicle seating system, comprising:
a vehicle seat;
a first pivot lever and a second pivot lever spaced apart from one another in an adjustment direction;
a plurality of pivot pins pivotally coupling the pivot levers to the vehicle seat and adapted to couple the pivot levers to a vehicle floor, the pivot pins extending parallel to one another;
wherein the pivot pins of the second pivot lever are lockable independently of one another by at least one drive apparatus, the second pivot lever comprising an additional pivot pin extending parallel to the plurality of pivot pins.

2. The vehicle seating system of claim 1, wherein the vehicle seat is movable over a length of at least 200 mm in the adjustment direction.

3. The vehicle seating system of claim 1, wherein the pivot levers have a length such that the vehicle seat describes a rising motion in the adjustment direction and a falling motion in the opposite direction.

4. The vehicle seating system of claim 1, wherein an intermediate lever is arranged to be between the additional pivot pin and the vehicle floor is of V-shaped configuration, its open angle facing approximately toward the first or the second pivot lever.

5. The vehicle seating system of claim 4, wherein the lockable pivot pin adapted to couple the second pivot lever to the vehicle floor can be driven by an electric motor.

6. The vehicle seating system of claim 4, wherein the lockable pivot pin adapted to couple the second pivot lever to the vehicle floor can be driven by means of a manually operated stepped shifting mechanism.

7. The vehicle seating system of claim 4, wherein the intermediate lever includes pivot pins having a shorter distance between them than the respective pivot pins arranged on the first pivot lever.

8. The vehicle seating system of claim 4, wherein the pivot pins arranged on the vehicle seat are driven by way of the at least one drive apparatus, locking of these pivot pins being accomplished via the at least one drive apparatus.

9. The vehicle seating system of claim 8, wherein the drive apparatus is embodied as a telescopic spindle-nut drive, driven by an electric motor, that at one end is articulated on the second pivot lever between the additional pivot pin and the vehicle seat, and at the other end is attached approximately in the vicinity of the pivot pin coupling the first pivot lever to the vehicle seat.

* * * * *